F. V. PHILLIPS.
SHOCK ABSORBER FOR VEHICLES.
APPLICATION FILED APR. 14, 1914.

1,140,478.

Patented May 25, 1915.
2 SHEETS—SHEET 1.

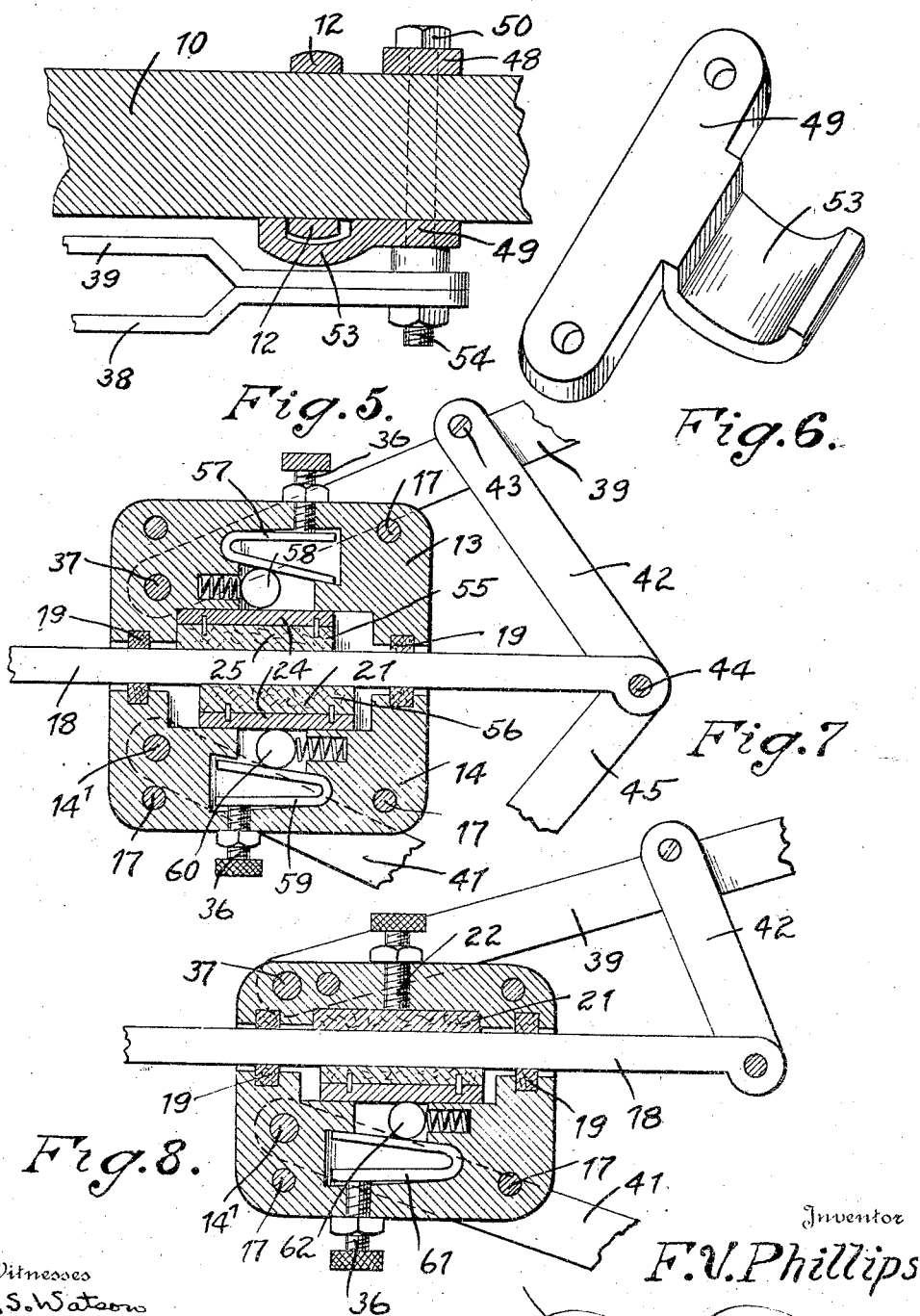

UNITED STATES PATENT OFFICE.

FRANCIS V. PHILLIPS, OF ORLANDO, FLORIDA.

SHOCK-ABSORBER FOR VEHICLES.

1,140,478.  Specification of Letters Patent.  Patented May 25, 1915.

Application filed April 14, 1914. Serial No. 831,782.

*To all whom it may concern:*

Be it known that I, FRANCIS V. PHILLIPS, a citizen of the United States, residing at Orlando, in the county of Orange, State of Florida, have invented certain new and useful Improvements in Shock-Absorbers for Vehicles; and I do hereby declare the following to be a full, clear, and exact description of the invention, such as will enable others skilled in the art to which it appertains to make and use the same.

This invention relates to shock absorbers for vehicles and particularly for automobiles.

The object of the invention resides in the provision of a shock absorber which relies solely upon the element of friction to efficiently dampen or deaden the action of the springs of a vehicle and particularly an automobile when said springs are violently compressed and rebound.

A further object of the invention resides in the provision of a shock absorber of the character named which embodies an improved construction whereby same may be rendered inactive upon either compression or rebounding of the springs, inactive upon both compression and rebounding, and active upon both compression and rebounding.

A still further object of the invention resides in the provision of a shock absorber in which the friction may be readily and easily controlled and varied and which embodies an improved and simple means for connecting same to the springs of a vehicle or automobile so that the device will always be held in correct relation to the associated spring.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a view in elevation showing the improved shock absorber associated with an automobile spring of the elliptical type; Fig. 2, a vertical section through the absorber on an enlarged scale; Fig. 3, a section on the line 3—3 of Fig. 2; Fig. 4, a section on the line 4—4 of Fig. 1 on an enlarged scale; Fig. 5, a section on the line 5—5 of Fig. 1 on an enlarged scale; Fig. 6, a perspective view of the hook element employed in the connection between the shock absorber and the vehicle spring; Fig. 7, a vertical longitudinal section of a modified form of the shock absorber, and Fig. 8, a vertical longitudinal section of still another modified form of the shock absorber.

Referring to the drawings A indicates an elliptical automobile spring comprising upper and lower sections 10 and 11 and which is adapted to be secured in place through the medium of clips 12 in the usual and well known manner.

The improved absorber is shown as comprising a pair of spaced body blocks 13 and 14 connected together by side plates 15 and 16 through the medium of rivets 17. Slidably mounted between the adjacent edges of the blocks 13 and 14 is a friction piston 18. Suitable packing 19 is provided between the blocks 13 and 14 at each end of the latter to prevent the entrance of dust and dirt into the space between said blocks. The face of the block 14 adjacent the block 13 is recessed as at 20 and seated in this recess is a fiber block 21 bearing against the piston 18 and adapted to be adjusted to compensate for wear through the medium of screws 22 mounted in the block 14. The face of the block 13 adjacent the block 14 is provided with a recess 23 in which is slidably mounted a plate 24 having secured thereto a fiber friction shoe 25 bearing against the piston 18. The rear wall of the recess 23 is provided with recesses 26 and 27 the inner ends of which are enlarged as at 28 and 29 respectively. A passage 30 connects the recesses 26 and 27 and mounted in this passage is a spring 31 which bears at its ends against rollers 32 and 33 disposed in the recesses 26 and 27 respectively and extending transversely of the block 13, said rollers in turn bearing against the plate 24. Mounted in the enlarged inner ends 28 and 29 of the recesses 26 and 27 are V-shaped leaf springs 34 and 35 respectively, said springs being disposed in opposition to each other and having corresponding arms positioned to engage respective rollers 32 and 33. The arms of the springs 34 and 35 remote from the rollers 32 and 33 are engaged by screws 36 respectively which are mounted in the block 13 and whereby the tension of the springs 34 and 35 may be adjusted as will be obvious. Pivoted to the plates 15 and 16 and block 13 on opposite sides of said block through the medium of a bolt 37 are arms 38 and 39. Pivoted to the plates 15 and 16 and block 14 on opposite sides of the block 14 through the medium of a bolt 14' are arms 40 and 41. A link 42 has one end pivotally connected with the arms 38 and 39 through the medium of the bolt 43, while the other end of said link is pivotally connected with the piston 18 through the medium of a bolt 44. A link 45 has one end pivotally connected with the arms 40 and 41 through the medium of a bolt 46, while the other end of said link is pivotally connected to the piston 18 through the medium of a bolt 47.

In order to secure the ends of the arms 38 and 39 remote from the bolt 37 to the section 10 of the spring A there is provided a clamp consisting of plates 48 and 49 disposed on opposite sides of the sections 10 and connected together by means of bolts 50 and 51 which serve to draw the plates 48 and 49 into clamping relation to the spring section 10. If desired a rubber packing 52 may be placed between the plates 48 and 49 and the spring section 10 but this is not essential. The plate 49 is provided with a hook extension 53 which is engaged over the clip 12 and serves to secure the clamp formed by the plates 48 and 49 and bolts 50 and 51 against any movement whatever on the spring section 10. The bolt 50 is provided with an extension 54 upon which is pivotally secured the ends of the arms 38 and 39 remote from the bolt 37. The ends of the arms 40 and 41 remote from the bolt 14' are pivotally connected to the spring section 11 in precisely the same manner as the arms 38 and 39 are connected to the section 10 and a detail description of such connection will therefore be omitted.

In the operation of the absorber it will be apparent that when the spring A is violently compressed the arms 38 and 39 and the arms 40 and 41 will move toward each other and as a result of the link connections between these arms and the piston 18 the latter will move longitudinally toward the ends of said arms connected with the spring A. During this movement of the piston 18 the plate 24 and friction shoe 25 will be drawn along with the piston as will also the roller 33. As the roller 33 moves it will engage the adjacent arm of the spring 35 and the tension of this spring operating the roller 33 will force the friction shoe 25 into engagement with the piston 18 with constantly increasing strength and result in a constant increase in the friction between the shoe and piston so as to deaden the compression of the spring. As the spring rebounds the piston 18 will move in the opposite direction when the roller 32, spring 34 and friction shoe 35 will operate in the manner just described to deaden the rebound of the spring A.

If it is desired to deaden only the compression of the spring A the screw 36 is operated outwardly so that the spring 34 will exert no tension upon the roller 32. If it is desired to deaden only the rebound of the spring A then the spring 34 is tensioned and the screw 36 operated to release the tension of the spring 35. To render the device entirely inactive the tension of both of the springs 34 and 35 is released. By adjusting the screw 36 it will be obvious that the friction present between the piston 18 and the shoe 25 can be readily varied to suit desired conditions.

In the modified form illustrated in Fig. 7 friction shoes 55 and 56 are arranged on opposite sides of the piston 18, the former being forced into engagement with the piston upon compression of the spring through the medium of a spring 57 and a roller 58 mounted in the block 13, while the latter is forced into engagement with the piston through the medium of a spring 59 and a roller 60 mounted in the block 14. The springs 57 and 59 are so arranged that the shoe 55 is active during the compression of the spring, while the shoe 56 is active during the rebound of the springs.

In the modified form illustrated in Fig. 8 the device is only capable of deadening the rebound of the spring. In this construction only one V-shaped spring 61 and coöperating roller 62 is employed, same being so arranged as to be rendered active when the piston 18 is moved under the influence of the rebound of the spring with which the device is associated.

What is claimed is:—

1. In a shock absorber, the combination of a body, a piston slidably mounted in the body, a friction shoe slidably mounted in the body and engaging said piston, a roller mounted in the body and engaging said friction shoe, spring means energized by said roller during the movement thereof in one direction, said spring means reacting to force the shoe into engagement with the piston, and means for connecting the piston to a vehicle spring.

2. In a shock absorber, the combination of a body, a piston slidably mounted in the body, a friction shoe slidably mounted in the body and engaging said piston, a pair of rollers mounted in the body and engaging said friction shoe, independent spring means energized alternately by the movement of said rollers under the influence of the movement of said shoe, each of said spring means reacting when energized to force the shoe into engagement with the piston, and means for connecting said piston to a vehicle spring whereby the compression and rebound of the spring will slide the piston.

3. In a shock absorber, the combination of a body, a piston slidably mounted in the body, a friction shoe slidably mounted in the body and engaging said piston, a pair of opposed V-shaped springs mounted in the body having corresponding arms inclined toward opposite ends of the shoe respectively, a roller interposed between each spring and the shoe, and means for connecting said piston to a vehicle spring whereby the compression and rebound of the spring will slide the piston.

4. A pivot clamp for attaching a pivoted member to a spring comprising spaced plates, bolts connecting said plates, and a hook extension on one of said plates adapted to engage over the securing clip of a spring.

In testimony whereof, I affix my signature, in the presence of two witnesses.

FRANCIS V. PHILLIPS.

Witnesses:
 ETHEL BARLOW,
 C. P. DICKINSON.